Dec. 9, 1958     N. A. WRIGGLESWORTH     2,863,989
MICROSCOPE ILLUMINATOR

Filed Sept. 23, 1957     2 Sheets-Sheet 1

INVENTOR
NORMAN A. WRIGGLESWORTH

BY Herbert C. Kimball
ATTORNEY

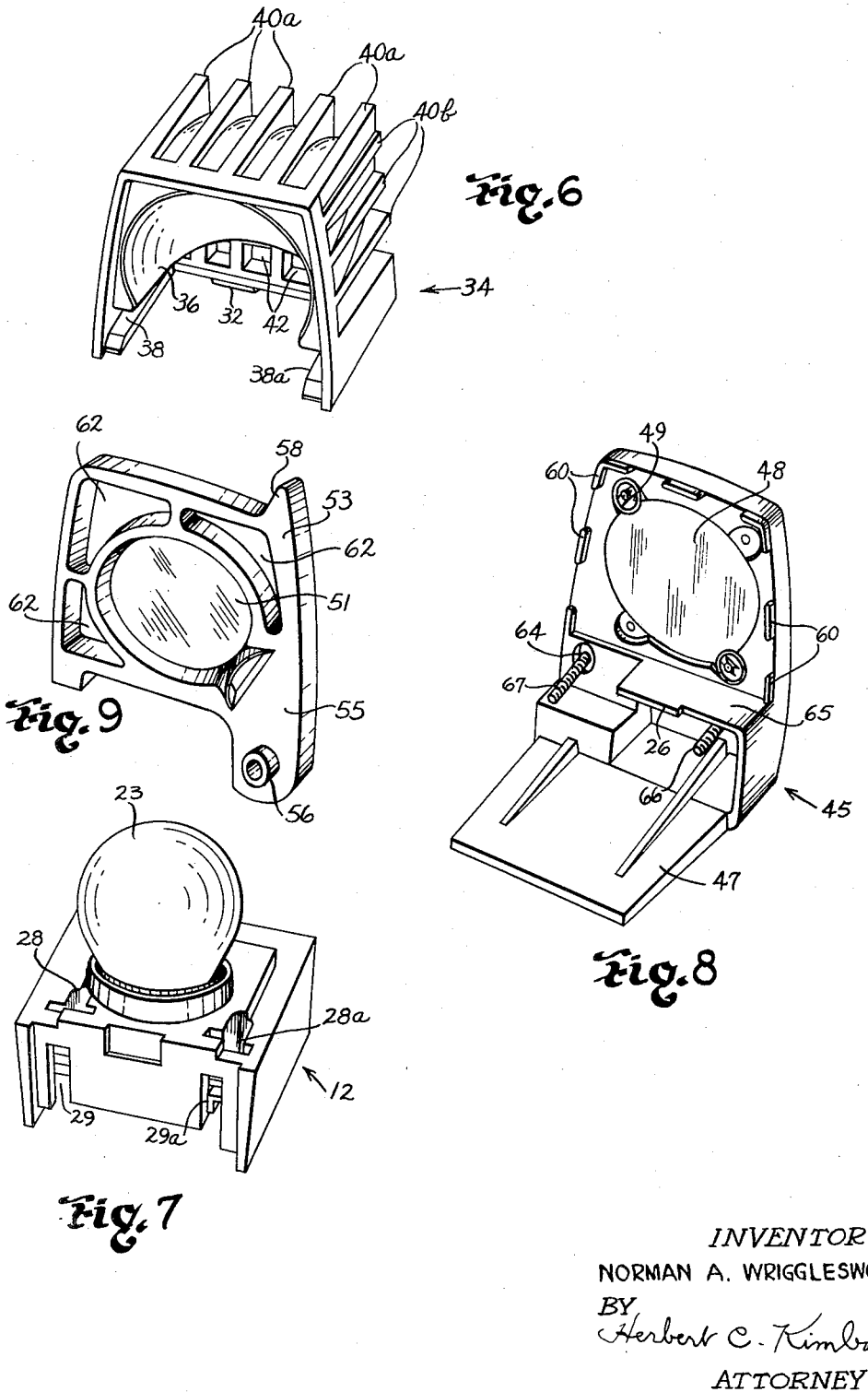

2,863,989

MICROSCOPE ILLUMINATOR

Norman A. Wrigglesworth, Buffalo, N. Y., assignor to American Optical Company, Southbridge, Mass., a voluntary association of Massachusetts Application September 23, 1957, Serial No. 685,500

3 Claims. (Cl. 240—41.3)

This invention relates to a compact illuminator which may be mounted under the substage of a microscope for passing light upwardly through the specimen to be observed, or which equally may rest on a table or other support for directing light laterally where such illumination is required.

Where the illumination of a specimen is critical, as in many forms of research work, the illuminator is generally built into the substage or otherwise accurately fitted to the microscope being used. For less critical work a separate illuminator may be used. The present invention relates to this latter type of illuminator.

An object of the invention is to provide so compact a device that it may be supported, if desired, below the substage of the microscope. A further object is the simplification of the construction of the illuminator, so that a plastic housing molded at minimum expense may be used to contain the lamp and accessories of the illuminator.

In the drawings which illustrate my invention,

In Figs. 3 to 8 inclusive, the parts are disposed as when used for directing light laterally;

Fig. 4 is a view in vertical section taken on the line 4—4 of Fig. 3;

Fig. 5 is a bottom plan view of the lamp base casting shown in Fig. 3;

Fig. 6 is a perspective view of the lamp housing casting;

Fig. 7 is a perspective view of the lamp base casting with a lamp inserted therein;

Fig. 8 is a perspective view of the lens mount casting;

Fig. 9 is a similar view of the filter and its frame, and

Figure 1:
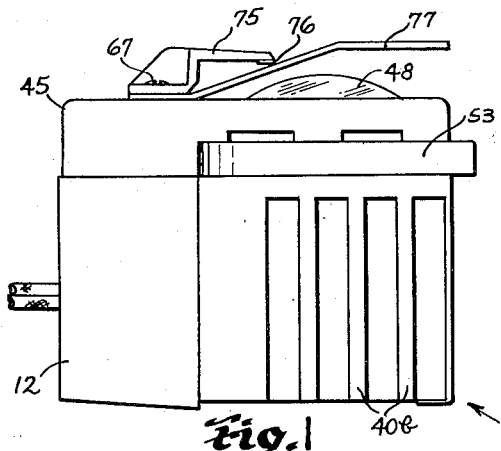
Fig. 1 is a view in elevation of an illuminator embodying my invention, the illuminator being disposed for insertion below the substage of a microscope.

The economy in the manufacture of a compact illuminator, through molding of the illuminator, is arrived at in accordance with my invention by molding the illuminator in parts which interfit so as to complement each other in the final assembly. The illuminator is made up principally of a lamp base casting, a lamp housing casting and a lens mount casting.

The lamp base casting 12 is shown in perspective in Fig. 7; and the details of its construction will be apparent from Figs. 2, 3, 4 and 5. In accordance with my invention as above summarized, the lamp base casting is left with an open bottom so that the electrical connections for the lamp are accessible. This open bottom is closed upon assembly by a plate-like extension from the lens mount casting, as will later be described.

The threaded copper shell or socket 14 is secured in the casting 12 by securing means 15. The usual central bottom contact 17 is secured in place by securing means 19 affording a terminal to which an electrical connection 20 may be made (see Fig. 5) this being one of the current supply wires. The other electrical connection 21 is made to one of the securing means 15 for the copper shell 14. When a lamp 23 is screwed into the socket 14, the wires 20 and 21 are adapted to supply current for energizing the lamp.

Figure 3:
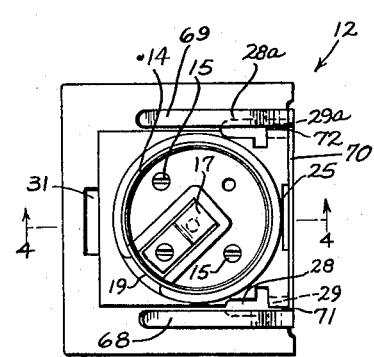
Fig. 3 is a plan view of the lamp base casting only.
Figure 5:
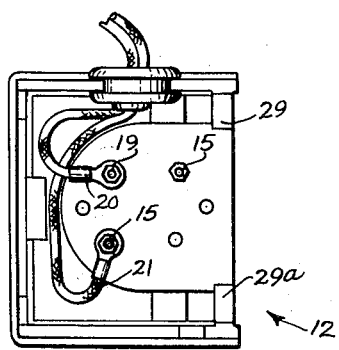
Figure 4:
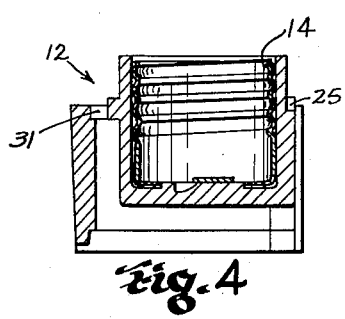

Referring to Figs. 3, 4 and 5 it will be noted that the molding of base casting 12 may be accomplished by a two-part mold whose parts, after molding, are withdrawn in opposite directions. The cavity for receiving the copper shell 14 is formed by one part of the mold. This same part of the mold forms a rabbeted edge at 25 for receiving a lip 26 on the lens mount casting (Fig. 8), as well as two T-shaped openings 28 and 28a which extend down to and communicate with lateral openings 29 and 29a. The same part of the mold may also form a slot 31 for receiving a locking tab 32 on the lamp housing (Fig. 6). It will thus be seen that both parts of the mold for this casting may be withdrawn by a simple mold technique due to the predetermined arrangement of the various tabs, slots, openings and rabbets.

The lamp housing casting 34 is formed with a spherical reflecting surface 36. Here again the casting is so constructed that it may be molded in a two-part mold requiring only two directions of withdrawal. The interior reflecting surface 36 as well as the shelf-like rests 38 and 38a are formed by one mold member. All of the cooling fins or ribs, both the top fins 40a and the side fins 40b, as well as the ventilation ports 42, are formed by the other mold member. The two mold parts combine to form the locking tab 32.

The mold member forming the reflecting surface 36 should be well polished, and this surface 36 may be metalized or coated with a white paint or lacquer to increase its reflectance.

Figure 2:
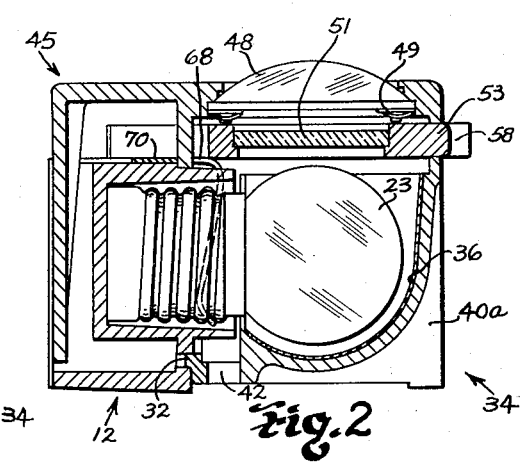
Fig. 2 is a view in vertical section through the center line of the lamp base, this view being a section of the illuminator shown in Fig. 1 but omitting the connections for attaching the illuminator below the substage, and showing the lamp and condensing lens in side elevation.

The lens mount casting 45 overlies the front of the lamp housing 34, and at the same time has a plate-like extension 47 at right angles thereto for underlying and closing the open bottom of the lamp base casting 12 (see Fig. 2). The condensing lens 48 is mounted by the casting 45 in front of the housing 34 so as to bring the light emitted by lamp 23 to bear upon the orifice of the substage of the microscope, or to concentrate the lamp's light upon the object being examined when use is made as a general illuminator. Securing means 49, such as washers, retain the lens 48 in its mount.

It is quite frequently desirable to use a filter in the illuminator, more especially where a preponderance of the yellow wave-lengths is undesirable. For instance, a blue filter 51 mounted in its frame 53 may be inserted between the lamp 23 and the condensing lens 48. The frame 53 is provided with a pivot leg 55 having a short trunnion 56 forming a pivot which enables the user to swing the filter frame 53 from its position in Fig. 2 to retracted position. A tab 58 is readily pushed to swing the frame 53 in or out. A plurality of spacer pads 60 on the casting 45 maintain a desirable spacing between the lens mount 45 and the filter frame 53 to afford free circulation of the heated air out of the lamp housing 34, to be replaced by cooler air through the ports 42. The openings 62 in the filter frame 53 assist in such circulation upward out of the lamp housing 34, especially in the position of Fig. 2. The trunnion 56 is received in an opening 64 in the casting 45, and a shelf 65 on the casting 45 serves as a rest when the filter is swung into operative position.

The assembly of the illuminator brings the complementary parts of the different castings together. Two bolts 66 and 67 extend inwardly through the lens mount casting 45 and engage nuts in the T-shaped slots 28 and 28a. Tightening of these bolts brings the lip 26 into engagement with the rabbet 25 while the plate-like extension 47 closes the bottom of the lamp base casting 12 (see Fig. 2). At the same time a leaf spring 70 having a pair of fingers 68 and 69 (see Fig. 3) is clamped between the lens mount casting and the lamp base casting. The spring 70 is further positioned due to the fact that it has spaced openings 71 and 72 through which the two bolts 66 and 67 pass in entering the lateral openings 29 and 29a. The bolt 67 also passes through the trunnion 56, on its axis of pivoting. Thus the two bolts 66 and 67 assemble the lamp base casting and the lens mount casting in interfitting relation.

The lamp housing casting 34 may now be slid over the lamp base casting to engage the fingers 68 and 69 of spring 70 with the shelf-like rests 38 and 38a. When the casting 34 has slid clear into operative position, the tab 32 catches by dropping into the slot 31 in the lamp base casting. Thus the casting 34 is ordinarily retained in operative position, but may be readily slid off the base casting 12 to replace a lamp 23 or for cleaning purposes. The housing is remarkably light-tight for a construction which is so economically made.

Preferably the castings are formed of a synthetic resin plastic. Phenolic condensation resins are particularly suited for this purpose, being resistant to heat once the molding is complete, and I have successfully used such a resin marketed under the trademark "Durez."

The illuminator in the form illustrated in Fig. 1 is conveniently attached to the slot which is generally provided beneath the substage of a microscope for receiving a filter or other accessory. According to this embodiment of my invention, attachment is made to the substage slot by a two-pronged bracket 75 having integral lugs 76 which are adapted to engage and lock onto the outer portion of the substage slot. Play is taken up by a spring 77 which presses against the external undersurface of the member containing the substage slot, and is provided with an opening which registers with the lens 48 to pass the light into the substage. Both the bracket 75 and the spring 77 are provided with spaced openings for receiving the bolts 66 and 67 so that the heads of the bolts may secure the bracket 75 and spring 77 to the illuminator.

Figure 10:
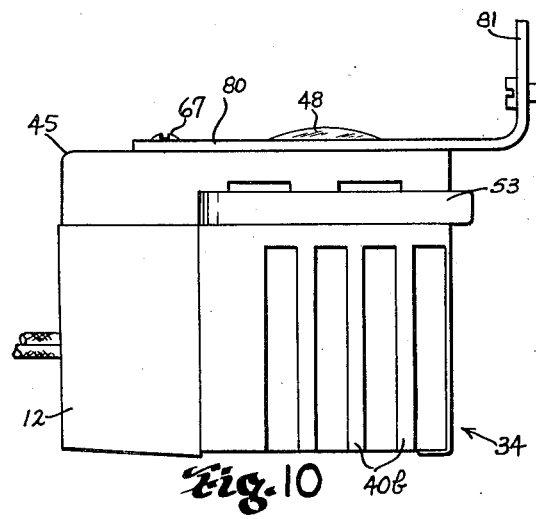
Fig. 10 is a view similar to Fig. 1 showing a modified form of connections for attaching the illuminator in position.

The form of my improved illuminator which is illustrated in Fig. 10 may be screwed or bolted onto the frame of a microscope or other instrument which is to be illuminated. In this embodiment of my invention a bracket 80, having an opening which registers with the lens 48 for passing the light, is secured to the illuminator by the heads of the bolts 66 and 67. The upturned end 81 of bracket 80 may be attached to the microscope by such securing means as the screw 83 shown in Fig. 10.

It is apparent that my improved illuminator has flexibility of use, as it is very compact so as to fit into the space below the substage of a microscope. For table use it may rest on the lamp base 12 and plate-like extension 47, or if desired may be tilted back to project light upwardly. The structure lends itself to the desired compactness, and at the same time is economical in manufacture.

I claim:
1. A microscope illuminator comprising a lamp base casting, a lamp housing casting and a lens mount casting, said castings each being made of synthetic resin plastic, said base casting having an open bottom to permit access to and insertion of electrical connections for the supply of electric current for the lamp, said base casting having in addition a slot for receiving a locking tab of said lamp housing, said lens mount casting having a plate-like extension at right angles thereto for underlying and closing the open bottom of said base casting, a resilient member clamped between said lens mount casting and said base casting and having resilient portions for seating said lamp housing casting on said base casting, said lamp housing casting having rests engaged by said resilient portions and a locking tab for engaging in said slot in the base casting when seated under pressure of said resilient member, and means for clamping said lens mount casting to said base casting with said plate-like extension closing the bottom of said base casting.

2. A microscope illuminator comprising a lamp base casting, a lamp housing casting and a lens mount casting, said castings each being made of synthetic resin plastic and said castings interfitting when assembled to form an illuminator, said base casting having an open bottom to permit access to and insertion of electrical connections for the supply of electric current for the lamp, said lens mount casting having a plate-like extension at right angles thereto for underlying and closing the open bottom of said base casting, a leaf spring member clamped between said lens mount casting and said base casting and having resilient fingers for seating said lamp housing casting on said base casting, said lamp housing casting having rests engaged by said fingers, said base casting and said lamp housing casting having an interfitting tab and slot connection for retaining said housing casting seated on said base casting under pressure of said leaf spring member, and a securing device extending through said leaf spring member and connecting said base casting and said lens mount casting to clamp said leaf spring member between said castings.

3. A microscope illuminator comprising a lamp base casting, a lamp housing casting and a lens mount casting, said castings interfitting when assembled to form an illuminator, said base casting having an open bottom affording access to and insertion of electrical connections for the supply of electric current to the lamp, said lens mount casting having a plate-like extension for underlying and closing the open bottom of said base casting, said lamp housing casting having at least one shelf-like rest overlying said base casting when said lamp housing casting is in position on said base casting, a spring having at least one resilient finger engaging said shelf-like rest to bias said lamp housing casting toward said base casting, and at least one threaded securing device extending through said spring and binding said base casting and said lens mount casting together and clamping said spring therebetween with said finger under tension.

References Cited in the file of this patent

UNITED STATES PATENTS

| | | |
|---|---|---|
| 2,040,476 | Early | July 23, 1946 |
| 2,636,976 | Eckert | Apr. 28, 1953 |